United States Patent Office 3,057,827
Patented Oct. 9, 1962

3,057,827
SULFINATE CONTAINING POLYESTERS
DYEABLE WITH BASIC DYES
John Malcolm Griffing, Kinston, N.C., assignor to E. I. du Pont de Nemours and Company, Wilmington, Del., a corporation of Delaware
No Drawing. Filed Dec. 21, 1959, Ser. No. 860,676
3 Claims. (Cl. 260—75)

This invention relates to a film- and fiber-forming synthetic copolyester and the shaped articles produced therefrom. More particularly it is concerned with a fiber-forming copolyester containing a minor proportion of a basic dye sensitizing unit as defined hereinafter and the shaped articles formed therefrom.

It is an object of the present invention to provide a shaped article produced from a copolyester, the said article having affinity for basic type dyes.

Another object is to provide a process for the production of a copolyester from which shaped articles having affinity for basic type dyes can be prepared.

These and other objects will become apparent in the course of the following specification and claims.

The polymer of the present invention is useful in the production of shaped articles by extrusion, molding, casting or the like. These shaped articles in turn may be formed into yarns, fabrics, pellicles, ornaments, or the like.

In accordance with the present invention, a high molecular weight linear condensation copolyester is prepared from linear polyester-forming compounds from the class consisting of a lower alkyl ester of a monohydroxymonocarboxylic acid; a lower alkyl diester of a dicarboxylic acid with a compound of the class consisting of an aliphatic glycol and a diester of an aromatic diol; and as an essential component a minor amount of a compound of the formula

wherein —M is an atomic equivalent of a metal;

is an organic radical; —Y is a member of the class consisting of —O—H,

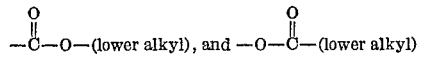

with the proviso that when —Y is —O—H, it is attached to a saturated carbon atom, i.e. a carbon atom free of double bond attachment to adjacent carbon; and —Y' is a member of the class consisting of —H and —Y. Preferably, —R— is an aromatic organic radical and —Y is

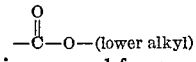

A preferred class is prepared from a dialkyl ester of terephthalic acid and a polymethylene glycol having the formula HO(CH₂)ₖOH, wherein $k$ is an integer of from 2 to about 10, in the presence of at least about 0.5 mol percent, based on the terephthalate content of the polymer, of a compound of Formula $a$ as shown above.

The product comprises a modified polyester, preferably a modified polyester wherein at least about 75% of the repeating units contain a carbocyclic ring, e.g. a polymeric polymethylene terephthalate, containing in the polymer molecule a minor proportion of organic radicals containing a sulfinate salt group. Thus the final product will contain recurring units of the structure

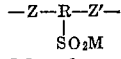

wherein the symbols —M and

have the values defined above, —Z— is a divalent radical of the class consisting of —O— and

and —Z'— is —Z— or —H.

The following example is cited to illustrate the invention. It is not intended to limit it in any manner.

The intrinsic viscosity of the polymer is used herein as a measure of the degree of polymerization of the polymer and may be defined as:

$$\text{limit } \frac{\ln \eta_r}{C} \text{ as } C \text{ approaches } 0$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent. By a "high molecular weight copolyester" as used herein is meant one having an I.V. value above about 0.2. Above about 0.3 the products are spinnable.

Example 1

A mixture of 100 parts of sodium 3,5-dicarbomethoxybenzenesulfonate and 168 parts of phosphorus oxychloride is heated at 105° C. for 15 hours with occasional shaking. The resulting pasty reaction mixture is poured onto 400 parts of cracked ice, following which the aqueous solution is extracted with two 200-part portions of diethyl ether. The ether extracts are combined and evaporated to dryness, yielding 80 parts of crude 5-chlorosulfoisophthalyl chloride, having a melting point of 101–106° C. The product is then added in small increments to a solution, maintained at 95° C., of 20 parts of sodium bisulfite and 30 parts of sodium hydroxide in 200 parts of water. The solution is agitated until all of the solids have dissolved, thereafter acidified with sulfuric acid (to litmus red) and extracted with two 200-part portions of diethyl ether. The ether extracts are combined and evaporated to dryness on a steam bath, yielding 25 parts of 3,5-dicarboxybenzenesulfinic acid. This product is then dissolved in 500 parts of 85% methanol-15% benzene containing 1 part of concentrated sulfuric acid. A mixture of benzene-water-methanol is slowly removed by distillation over a period of 8 hours, a constant level of the esterification mixture being maintained by continuous addition of methanol-benzene solution, after which the mixture is cooled and treated with sodium carbonate until neutral to litmus. Upon standing in a refrigerator overnight, a white crystalline product forms which is filtered off, washed with three 25-part portions of cold methanol, and dried in a vacuum desiccator. The product is sodium 3,5-dicarbomethoxybenzenesulfinate,

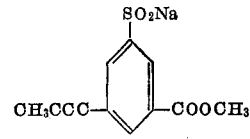

When a trace of the product is treated with anisole and concentrated sulfuric acid, the mixture exhibits an orange color (positive Smile's test for presence of the sulfinate radical).

1.45 parts of sodium 3,5-dicarbomethoxybenzenesulfinate are added to 49 parts of dimethyl terephthalate, 34.5 parts of ethylene glycol, 0.023 part of manganous acetate, 0.015 part of antimony trioxide, and 0.035 part of sodium methoxide, the ratio of the sulfinate salt to dimethyl terephthalate being about 2 mol percent. The mixture is heated for 3 hours, the temperature rising from 140° to 225° C. with evolution of methanol. The pressure is then reduced to 1 mm. of mercury and the temperature is increased to 275° C. After 4 hours a polymer is obtained having an intrinsic viscosity of 0.42. A small portion of the polymer gives a positive reaction in the Smile's test for presence of sulfinates, as described above. A thin film pressed from the polymer is observed to be highly flexible. It is immersed for 2 hours at 100° C. in an aqueous solution of 2% (based on the weight of the film) of a basic dye of the oxazine type having the following chemical structure:

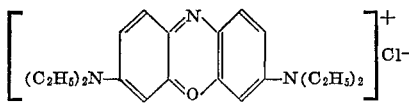

The film is dyed to a medium shade of blue having good wash-fastness properties.

A control sample of polyethylene terephthalate prepared by following the above procedure, except that 50 parts of dimethyl terephthalate are used and no sodium 3,5-dicarbomethoxybenzenesulfinate is added, is found to have an intrinsic viscosity of 0.51. As expected, the polymer gives a negative result (no color change) in the Smile's test for presence of sulfinates. A thin film pressed from the polymer, when dyed under the conditions described above, adsorbs only a faint blue color, and what color appears is easily removed by scouring in hot water or hot chlorobenzene.

Polyethylene terephthalate modified with sodium 3,5-dicarbomethoxybenzenesulfinate as exemplified above is readily melt spun into yarns by procedures well known in the art, following which the yarns may be processed into fabrics dyeable with basic dyes.

When the preparation of the modified polyester according to the procedure described above is repeated, except that only 41.7 parts of dimethyl terephthalate is used and 7.3 parts of dimethyl isophthalate are added, a copolyester having high sensitivity to basic dyes is produced. A copolyester of similar high sensitivity to basic dyes is produced by substituting for the 49 parts of dimethyl terephthalate a mixture of 36.7 parts of dimethyl terephthalate and 14.6 parts of dimethyl sebacate. Similarly, a polyester having high sensitivity to basic dyes is produced by employing a mixture of 47.1 parts of butanediol-1,4, 49 parts of dimethylene terephthalate, and 1.45 parts of sodium 3,5-dicarbomethoxybenzenesulfinate with the same catalyst and following the procedure described above.

*Example 2*

2.9 parts of sodium 3,5-dicarbomethoxybenzenesulfinate is added to 98 parts of dimethyl hexahydroterephthalate, 66 parts of ethylene glycol, 0.0425 part of manganous acetate, and 0.0284 part of antimony trioxide, the ratio of the sulfinate salt to dimethyl hexahydroterephthalate being about 2 mol percent. Methanol is removed from the reaction mixture as the temperature is raised from 190 to 220° C. over a two-hour period. Polymerization is then contined at 275° C. under 1 mm. of mercury for two hours, resulting in a polymer of fiber-forming molecular weight. The polymer is pressed into thin films onto a backing of satin-faced ribbon prepared from unmodified polyethylene terephthalate yarn. When the film is treated for two hours at 100° C. in an aqueous solution of 2% (based on the weight of the film) of the basic dye having the structure shown in Example 1 it is dyed a medium shade of blue.

A control sample of polyethylene hexahydroterephthalate is prepared following the above instructions, except that 100 parts of dimethyl hexahydroterephthalate is used and no sodium 3,5-dicarbomethoxybenzenesulfinate is used. The resulting polymer, which is of fiber-forming molecular weight, is formed into a thin film and the film is pressed onto a backing of polyethylene terephthalate satin-faced ribbon. When subjected to the dye bath conditions described above, however, the film adsorbs only a faint blue tint of color.

*Example 3*

3.6 parts of potassium 2-carbomethoxybenzenesulfinate is added to 97 parts of dimethyl terephthalate, 151 parts of p-hexahydroxylylene glycol (65% trans-, 35% cis-), and 0.08 part of tetraiosopropyl titanate. The ratio of the sulfinate salt to dimethyl terephthalate is accordingly about 3 mol percent. Methanol is removed from the reaction mixture as the temperature is raised from about 135 to 230° C. over a three-hour period. Poly-condensation is then carried out at 280° C. under 1 mm. of mercury for three hours, resulting in a fiber-forming polymer. A thin film pressed from this polymer is dyed a medium shade of bluish red with Fuchsine SBP dye.

A control sample of poly(p-hexahydroxylylene terephthalate) is prepared following the above instructions, except that no potassium 2-carbomethoxybenzenesulfinate is used. The resulting polymer, which is found to be fiber-forming, is pressed into thin films; however, the films are dyed only a pale shade of pink with Fuchsine SBP dye.

*Example 4*

5.1 parts of calcium 1-carbomethoxynaphthalene-2-sulfinate is added to 122 parts of dimethyl 2,6-naphthalenedicarboxylate, 69 parts of ethylene glycol, 0.0425 part of manganous acetate, and 0.0284 part of antimony trioxide. The ratio of 1-carbomethoxynaphthalene-2-sulfinate to 2,6-naphthalenedicarboxylate is accordingly about 4 mol percent. Methanol is removed from the reaction mixture as the temperature is raised from about 150° to 230° C. over a three-hour period. Polycondensation is then carried out at 280° C. under 1 mm. of mercury for three hours, resulting in a fiber-forming polymer. A thin film pressed from this polymer is treated for two hours at 100° C. with an aqueous solution of 2% (based on the weight of the film) of the basic dye having the structure shown in Example 1. The film is dyed a medium shade of blue having excellent wash-fastness.

A control sample of polyethylene 2,6-naphthalenedicarboxylate is prepared following the above instructions, except that no calcium 1-carbomethoxynaphthalene-2-sulfinate is added. A fiber-forming polymer is produced which, when pressed into films and subjected to the same dye bath conditions described above, adsorbs only a faint tint of the dye.

*Example 5*

0.56 part of potassium 4-(β-carbethoxyethyl)benzenesulfinate is added to 16.4 parts of methyl p-(2-hydroxyethoxy)benzoate and 0.05 part of tetraiosopropyl titanate, the ratio of the sulfinate salt to the benzoate ester being about 2 mol percen. The mixture is polymerized at 240° and 0.5 mm. of mercury for three hours, resulting in a fiber-forming polymer. A film pressed from this polymer is treated for two hours at 100° C. with an aqueous solution of 2% (based on the weight of the film) of the basic dye having the structure shown in Example 1. The film is dyed a medium shade of blue, and the film retains its blue color after repeated scourings in hot water or in hot chlorobenzene.

A control sample of polyethylene p-oxybenzoate is prepared following the above instructions, except that no potassium 4-(β-carbethoxyethyl)benzenesulfinate is used. A fiber-forming polymer is produced which, when pressed into films and dyed under the conditions described above, exhibits some blue color; however, scouring in hot water or in hot chlorobenzene readily leaches the dye from the film.

As is illustrated in the example, the basically dyeable copolyester of the invention may be prepared by reacting a compound of Formula a above with compounds useful in making a film- or fiber-forming condensation polyester. The modifying addition may be introduced at any stage of polymerization. Preferably, it is included among the initial polymerization reactants. Any organic compound containing a sulfinate salt group together with one or two ester-forming functional groups, i.e. carboxylic ester functional groups, hydroxyl groups, or esterified hydroxyl groups, is suitable as an additive in the polymerization reaction. Preferably, additives in which the sulfinate salt group is attached to an aromatic nucleus are used. Examples of additives which may be employed are sodium 3,5-dicarbomethoxybenzenesulfinate as well as the corresponding calcium, lanthanum and lead salts; potassium m-carboethoxybenzenesulfinate; sodium p-carbomethoxybenzenesulfinate; calcium 2-bromo-5-carbomethoxybenzenesulfinate; lithium 1,8-dicarbomethoxynaphthalene-3-sulfinate, sodium 2,5-dicarbomethoxybenzenesulfinate, zinc 4,4'-dicarbomethoxybiphenyl-2-sulfinate, sodium-3-hydroxypropane-1-sulfinate, sodium 4,4-dicarbethoxy-1-butanesulfinate, potassium 4-($\beta$-hydroxyethoxy)benzenesulfinate, cadmium 3-bromo-6-carbomethoxybenzenesulfinate, cadmium 3-chloro-6-carbomethoxybenzenesulfinate; potassium 2-($\beta$-carbomethoxyethyl)benzenesulfinate; sodium 5-acetoxynaphthalene-1-sulfinate; and sodium 6-acetoxyanphthalene-2-sulfinate. In general, compounds containing functional groups other than the ester-forming groups and sulfinate salt groups will be avoided. However, the modifying additive may contain inert substituents such as halogen substituents. The alkali metal salts are preferred. However, the sulfinate salts of alkaline earth metals and other metals may also be used. It is not necessary that the metal be univalent. In cases in which the sulfinate salt is highly insoluble, fine dispersion of the additives may be required during the early stages of the reaction. Metals such as iron and copper which normally exhibit color in their salts may, if used in the sulfinate additives, contribute a pale color to the polymer.

Preferably the modified polymers contain at least about 0.5 mol percent of modifying units, based on the number of mols of recurring ester structural units (such as the recurring ethylene terephthalate structural unit in polyethylene terephthalate). Polyesters containing less than about 0.5 mol percent of the sulfinate-carrying units will usually have only a relatively low affinity for basic dyes. Polyesters containing about 10 mol percent of the sulfinate modifier have a very high affinity for basic dyes. Higher concentrations do not lead to appreciable increases in basic dyeability. Concentrations of 1 to 5 mol percent of the sulfinate modifier are regarded as optimum and are preferred. The sulfinate-salt modified polyesters of the present invention are substantially colorless or white, an important requirement when the polymer is prepared for textile end uses.

The sulfinate-salt modified polyesters are relatively stable in the melt and may be heated for long periods of time if this is required for some reason. However, the sulfinate salt radicals also have the capacity to act as reducing agents, and in this capacity they serve to protect the polyester from oxidation through the action of adventitious oxidizing agents to which the melt may be exposed. Reaction of a portion of the sulfinate salt radicals as reducing agents in this way does not reduce the affinity of the polyester for basic dyes. However, under the reaction conditions normally prevailing in melt polymerization, the major portion of the radicals remain in the initial sulfinate salt form, as evidenced by positive reaction of the polymer in tests for the presence of sulfinate radicals (such as Smile's test).

Modified polyethylene terephthalate is the preferred species of the invention. Other fiber-forming, water-insoluble polyesters, which may be modified in accordance with the present invention with a modifier or modifiers as described herein as well as mixtures thereof, are polyethylene bibenzoate, prepared by condensing ethylene glycol with p,p'-bibenzoic acid; poly(p-hexahydroxylylene terephthalate), prepared by condensing terephthalic acid with cis- or trans-p-hexahydroxylylene glycol, or a mixture of the cis- and trans-isomers, polyethylene 1,5- or 2,7-naphthalenedicarboxylate, prepared by condensing ethylene glycol with dimethyl 1,5- or 2,7-naphthalenedicarboxylate; poly(p,p'-isoproplidenediphenyl-isophthalate), prepared by condensing diphenylolpropane with diphenyl isophthalate; polyhexamethylene adipate, prepared by condensing hexamethylene glycol with diethyl adipate; and polyethylene sebacate, prepared by condensing ethylene glycol with dimethyl sebacate. The invention is applicable as well to polyesters produced by the self-condensation of monohydroxy carboxylates, such as ethyl 4-(beta-hydroxyethoxy)-3-methylbenzoate. The additives may also be incorporated into copolyesters, preparing by reacting a glycol wtih a mixture of dicarboxylic esters or a dicarboxylic ester with a mixture of glycols. Preferred fiber-forming linear condensation polyesters are those in which the solidified polyester fibers remain tenacious when immsered in water at 100° C. Fibers which dissolve, melt, or become quite soft in boiling water obviously have relatively little utility as textile fibers which are intended to be dyed, since nearly all commercial textile dyeing operations are carried out in water at or above 100° C. The modified polyesters are highly useful as dyeable textile fibers when spun in accordance with known methods. The may also be extruded into films which are highly receptive to basic coloring materials in printing or dyeing. Ribbons and other useful shaped articles may also be prepared by known methods.

Various other materials may be present in the reaction mixture. For example, ester interchange and polymerization catalysts such as salts of calcium, manganese, or lanthanum, titanate esters such as tetraisopropyl titanate, or oxides such as antimony trioxide will usually be present. Color inhibitors, such as phosphoric acid, its salts, or its alkyl or aryl esters, may be used. In addition, pigments, delusterants, or other additives may be present, such as titanium dioxide or barium carbonate.

The yarns produced from the polymer of the present invention are suitable for the usuable textile applications. They may be employed in the knitting or weaving of fabrics of all types as well as in the production of non-woven, felt-like products produced by known methods. Their physical properties closely parallel those of their related polyester fibers. However, they have particular sensitivity toward basic dyes. By a "basic dye" is meant a colored cationic organic substance such as those containing sulfonium, oxonium, or quaternary ammonium functional groups. Among the basic dyes which may be applied to the filament formed in accordance with the present invention may be mentioned Victoria Green WB (C. I. 657); Rhodamine B (C. I. 749); Brilliant Green B (C. I. 662); Victoria Pure Blue BO (Pr. 198); and the like.

Many equivalent modifications of the above will be apparent to those skilled in the art from a reading of the above without a departure from the inventive concept.

This is a continuation-in-part of United States application, Serial No. 690,197, filed October 15, 1957.

What is claimed is:

1. A synthetic linear condensation copolymer capable of orientation along the fiber axis when in fiber form, consisting essentially of a carbonyloxy polyester wherein the carbonyloxy linkages are an integral part of the polymer chain, with the proviso that in at least about 75 mol percent of the repeating ester units in the said polyester, there is present as an integral part of the polymer chain, at least one divalent carbocyclic hydrocarbon ring containing at least six carbons, the said polyester having an intrinsic viscosity of at least about 0.2 in a mixture of 58.8 parts of phenol and 41.2 parts of trichlorophenol and the said polyester containing as an integral part of the polymer chain from about 0.5 mol percent to about 10 mol percent, based on the acidic component of the said polyester, of a basic dye sensitizing unit which is a metallic salt of the structure

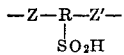

wherein

is a member of the group consisting of hydrocarbon and halohydrocarbon, —Z— is a divalent member of the class consisting of

and —O—; —Z'— is a member of the class consisting of —Z— and hydrogen; both —Z— and —Z'— are attached to carbon of

with the further proviso that when either of —Z— or —Z'— is —O—, the carbon of

to which it is attached is saturated; the remainder of the radicals of the said polyester, to which —Z— and —Z'— are attached and which are joined by the said carbonyloxy linkages, being selected from the group consisting of (1) divalent hydrocarbon radicals and (2) carbocyclic hydrocarbon radicals joined through oxa-alkylene to the said carbonyloxy linkages.

2. The copolyester of claim 1 wherein the major polymeric component is polyethyleneterephthalate.

3. The copolyester of claim 2 wherein the said sulfinate radical is

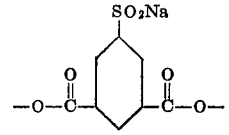

References Cited in the file of this patent

UNITED STATES PATENTS 2,035,578    Wagner _____ Mar. 31, 1956

FOREIGN PATENTS 549,179    Belgium _____ July 14, 1956
745,412    Great Britain _____ Feb. 22, 1956